United States Patent
Kim et al.

(10) Patent No.: US 11,160,643 B2
(45) Date of Patent: Nov. 2, 2021

(54) SYSTEM AND METHOD FOR DENTAL IMPLANT PLANNING

(71) Applicant: CORELINE SOFT CO., LTD., Seoul (KR)

(72) Inventors: Jin Kook Kim, Seoul (KR); Sung Goo Kwon, Seoul (KR); Ji Min Kim, Jeollabuk-Do (KR)

(73) Assignee: Coreline Soft Co., Ltd., Seoul (KR)

(*) Notice: Subject to any disclaimer, the term of this patent is extended or adjusted under 35 U.S.C. 154(b) by 358 days.

(21) Appl. No.: 15/964,796

(22) Filed: Apr. 27, 2018

(65) Prior Publication Data
US 2018/0311019 A1    Nov. 1, 2018

(30) Foreign Application Priority Data

Apr. 28, 2017   (KR) ........................ 10-2017-0054789

(51) Int. Cl.
| | |
|---|---|
| *A61C 13/00* | (2006.01) |
| *A61C 13/08* | (2006.01) |
| *A61C 5/77* | (2017.01) |
| *A61C 9/00* | (2006.01) |
| *A61C 1/08* | (2006.01) |
| *G06F 30/00* | (2020.01) |

(52) U.S. Cl.
CPC ............ *A61C 13/0004* (2013.01); *A61C 5/77* (2017.02); *A61C 13/08* (2013.01); *A61C 1/084* (2013.01); *A61C 9/0046* (2013.01); *G06F 30/00* (2020.01)

(58) Field of Classification Search
CPC .............. A61B 34/10; A61B 2034/102; A61B 2034/108; A61C 1/084; A61C 5/77; A61C 8/0089; A61C 9/0046; A61C 13/0004; A61C 13/08; G06F 30/00; G06F 30/20
USPC ........................................................ 433/223
See application file for complete search history.

(56) References Cited

U.S. PATENT DOCUMENTS

| | | | |
|---|---|---|---|
| 8,932,058 B2 | 1/2015 | Fisker et al. | |
| 8,974,229 B2 | 3/2015 | Fisker et al. | |
| 9,358,083 B2* | 6/2016 | Clausen | A61C 13/08 |
| 2013/0060532 A1* | 3/2013 | Clausen | A61C 13/08 703/1 |
| 2013/0289951 A1* | 10/2013 | Kuo | G06F 30/00 703/1 |
| 2015/0111177 A1* | 4/2015 | Fisker | A61C 13/08 433/196 |
| 2017/0360533 A1* | 12/2017 | Choi | G06T 7/11 |
| 2017/0364659 A1* | 12/2017 | Choi | G06F 30/20 |

(Continued)

FOREIGN PATENT DOCUMENTS

| | | |
|---|---|---|
| KR | 10-1623356 B1 | 5/2016 |
| KR | 10-1638561 B1 | 7/2016 |
| KR | 10-1666982 B1 | 10/2016 |

*Primary Examiner* — Matthew M Nelson
(74) *Attorney, Agent, or Firm* — Nelson Mullins Riley & Scarborough LLP; Kongsik Kim, Esq.

(57) ABSTRACT

Disclosed are a system and method for dental implant planning. The method for dental implant planning includes: detecting a region in which a plurality of teeth has been lost based on a teeth image; placing a plurality of virtual crowns in the region in which the plurality of teeth has been lost; receiving a user's confirmation for the plurality of virtual crowns; and setting up a plan for a plurality of implant objects, to be placed in the region in which the plurality of teeth has been lost, based on the plurality of virtual crowns.

11 Claims, 7 Drawing Sheets

(56) References Cited

U.S. PATENT DOCUMENTS

2018/0005371 A1\* 1/2018 Sabina ..................... A61B 6/14
2018/0042708 A1\* 2/2018 Caron ................ A61C 13/0003

\* cited by examiner

SYSTEM AND METHOD FOR DENTAL IMPLANT PLANNING

CROSS-REFERENCE TO RELATED APPLICATION

This application claims under 35 U.S.C. § 119(a) the benefit of Korean Patent Application No. 10-2017-0054789 filed on Apr. 28, 2017, which is incorporated herein by reference.

TECHNICAL FIELD

The present invention relates generally to a method for dental implant planning and a system for the performance of the method, and more specifically to technology which can reduce complexity, increase accuracy and improve user convenience when determining the locations of implant objects during dental implant planning.

BACKGROUND ART

Implants are used to replace missing teeth. The procedure for setting up a plan for the appropriate location and direction of the placement of an implant and the appropriate size and type of the implant is significantly important for successful implantation.

Conventionally, when an implant plan is set up using a dental implant planning program, the locations and angles of prostheses, such as a fixture, an abutment, a virtual crown, and the like, are determined fully depending on the experience and sensation of a program user. Accordingly, there are deviations between users, with the result that a problem arises in that the reliability of implantation is impaired.

Furthermore, a guide for the setup of an implant plan is not provided. Accordingly, a user has to repeatedly revise an implant plan, which results in an increase in the time required to set up the implant plan and an increase in the complexity of the procedure required to set up the implant plan.

Korean Patent No. 10-1623356 entitled "Method for Guidance on Dental Implant planning, and Apparatus and Storage Medium Therefor" has been proposed as an attempt to reduce the time required to set up an implant plan and reduce the complexity of the procedure required to set up the implant plan.

The above related art document presents a guidance scheme which can reduce dependence on the experience of a user and can reduce time and the complexity of a procedure. The above related art document proposes a technology for presenting an efficient guide while providing an implant plan for each tooth in the form of a virtual crown. However, the technology of the above related art document is problematic in that when implant plans for a plurality of teeth are simultaneously set up, an excessively long time is required because for each tooth, a guide must be provided and a plan must be set up.

SUMMARY OF THE DISCLOSURE

The present invention has been conceived to overcome the above-described problems, and an object of the present invention is to provide a guide configured to enable an implant plan to be set up by taking into account an aesthetic factor and the final satisfaction of a patient first.

An object of the present invention is to simplify a process to be applied to a plurality of teeth in the same manner in a situation in which simultaneous implantation for a plurality of teeth is required in the case of full mouth esthetic (edentulous) implantation or the like, thereby curtailing the procedure and time required to set up an overall implant plan.

An object of the present invention is to provide an effective implant plan optimization user interface (UI) for a plurality of teeth.

An object of the present invention is to provide a two-step implant plan optimization technique in which a criterion, which is to be collectively followed by a plurality of teeth, is generated by taking into an aesthetic factor and the function of the teeth in a composite manner and then each of the plurality of teeth is optimized within the bounds of the criterion.

According to an aspect of the present invention, there is provided a computing system for dental implant planning, the computing system including a processor and being connected to a display device, the processor including: a detection unit configured to detect a region in which a plurality of teeth has been lost based on a teeth image; a first setting unit configured to place a plurality of virtual crowns in the region in which the plurality of teeth has been lost; a user interface control unit configured to receive an input based on a user's operation of confirming the plurality of virtual crowns; and a second setting unit configured to set up a plan for a plurality of implant objects, to be placed in the region in which the plurality of teeth has been lost, based on the plurality of virtual crowns.

The first setting unit may generate a first rule, which is to be followed by the plurality of teeth collectively, for the region in which the plurality of teeth has been lost, and may then place the virtual crowns for the respective teeth within the bounds of the first rule.

The first setting unit may compute the contour lines of the plurality of lost teeth to be restored based on the region in which the plurality of teeth has been lost and the number of the plurality of lost teeth; and may generate each of the plurality of virtual crowns based on the contour lines of the plurality of lost teeth to be restored. In this case, the contour lines of the plurality of lost teeth to be restored may be determined by taking into account a combination of factors, including an aesthetic characteristic, the mastication function of the plurality of teeth, and the like.

The first setting unit may set the size and shape of each of the plurality of virtual crowns based on the region in which the plurality of teeth has been lost and the number of the plurality of lost teeth. In this case, the first setting unit may set the size and shape of each of the plurality of virtual crowns by using a reference teeth model generated based on the region in which the plurality of teeth has been lost and the number of the plurality of lost teeth. In other words, the computing system may determine whether an implantation target region is a molar region, an overall region (in the case of edentulous or full mouth esthetic implantation), or a region for the replacement of a specific lost tooth first, and may then invoke a reference teeth model.

The first setting unit may receive a reference teeth model generated based on the region in which the plurality of teeth has been lost and a number of the plurality of lost teeth, and may initially place the reference teeth model in the region in which the plurality of teeth has been lost; the user interface control unit may provide batch correction mode for the initially placed reference teeth model; and the first setting unit may form the reference teeth model having undergone the batch correction mode into the plurality of virtual crowns.

In this case, the user interface control unit may provide mode adapted to enable sizes of the initially placed reference teeth model to be corrected in a batch manner in accordance with a length of an arc of an arch of a subject, as the batch correction mode.

In this case, the batch correction mode may be a user interface menu configured to enable the size of the initially placed reference teeth model to be corrected within the bounds of the first rule set by the first setting unit, i.e., a range defined by the contour lines of the plurality of teeth to be restored. The contour lines of the plurality of teeth to be restored may be designated by taking into account all of the length direction of the arc of the arch, a depth direction perpendicular to the arc of the arch, and the height direction of the teeth.

According to another aspect of the present invention, there is provided a method for dental implant planning which is executable by the computing system, the method including: detecting a region in which a plurality of teeth has been lost based on a teeth image; placing a plurality of virtual crowns in the region in which the plurality of teeth has been lost; receiving a user's confirmation for the plurality of virtual crowns; and setting up a plan for a plurality of implant objects, to be placed in the region in which the plurality of teeth has been lost, based on the plurality of virtual crowns.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Preferred embodiments of the present invention will be described in detail below with reference to the accompanying drawings. In the following description of the present invention, when it is determined that a detailed description of a well-known component or function may unnecessarily make the gist of the present invention obscure, the detailed description will be omitted.

The present invention proposes a two-step dental implant planning method in which contour lines (contour lines to be restored) to be formed after the restoration of a plurality of teeth by considering an aesthetic factor and the final satisfaction of a patient in a composite manner are set by taking into account all x-, y- and z-axis directions first and then each of the teeth is optimized within the bounds of the contour lines to be restored.

For a configuration for determining each structure (a fixture, an abutment, or the like) within virtual crowns after the placement of the virtual crowns, reference may be made to the process stipulated in the above-described related art document, i.e., Korean Patent No. 10-1623356.

The present invention is configured to simplify a process to be repeated for individual teeth or replace the process with a collective process for a plurality of teeth when setting up a batch implant plan for the plurality of teeth, thereby curtailing the procedure and time required to set up an overall implant plan.

The present invention may be configured to set up a plan after invoking a reference teeth model into which the locations of lost teeth have been incorporated. A part of description of implementation of the reference teeth model may be replaced with the description given in Korean Patent No. 10-1623356, especially regarding the fixture and the abutment. The reference teeth model may be invoked, may be placed in virtual crowns, and may be corrected via a selective correction UI or batch correction mode. The correction of a plurality of teeth may be performed in a collective manner, which may be followed by the process of optimizing each of the teeth.

The correction based on user input and the optimization based on user input described herein correspond to a type of verification process using the experience and professional knowledge of a user. In an embodiment of the present invention, the correction or optimization based on user input may be replaced with correction or optimization based on the computation of a computing system.

The batch correction of a plurality of teeth and the process of optimizing each of the teeth may be partially limited by the arch and occlusal surface of a patient. In other words, the batch correction and the optimization process can be performed within the bounds of the arch and the occlusal surface.

Figure 1:
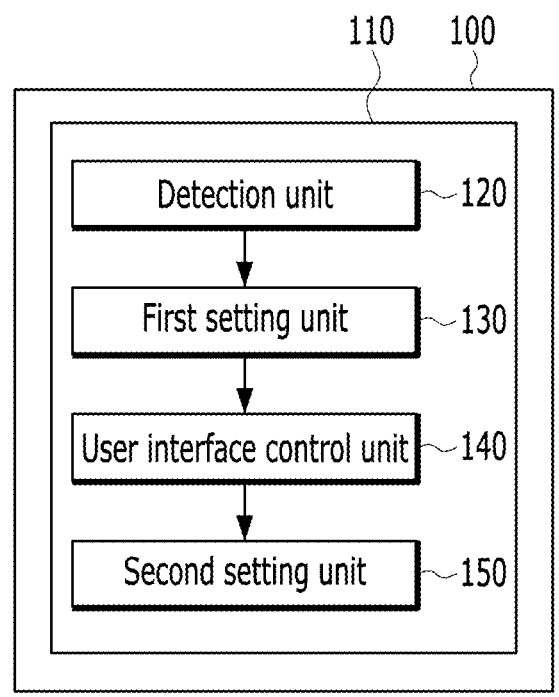
FIG. 1 is a view showing a computing system for dental implant planning according to an embodiment of the present invention.

FIG. 1 is a view showing a computing system 100 for dental implant planning according to an embodiment of the present invention.

The computing system 100 includes a processor 110, and is connected to a display device (not shown). The processor 110 includes: a detection unit 120 configured to detect a region in which a plurality of teeth has been lost based on a teeth image; a first setting unit 130 configured to place a plurality of virtual crowns in the region in which the plurality of teeth has been lost; a user interface control unit 140 configured to receive an input based on a user's operation of confirming the plurality of virtual crowns; and a second setting unit 150 configured to set up a plan for a plurality of implant objects, to be placed in the region in which the plurality of teeth has been lost, based on the plurality of virtual crowns.

The first setting unit 130 may generate a first rule, which is to be followed by the plurality of teeth collectively, for the region in which the plurality of teeth has been lost, and may then place virtual crowns for the respective teeth within the bounds of the first rule.

The first setting unit 130 may compute the contour lines of the plurality of lost teeth to be restored based on the region in which the plurality of teeth has been lost and the number of the plurality of lost teeth, and may generate each of the plurality of virtual crowns based on the contour lines of the plurality of lost teeth to be restored. In this case, the contour lines of the plurality of lost teeth to be restored may be determined by taking into account a combination of factors, including an aesthetic characteristic, the mastication function of the plurality of teeth, and the like.

The first setting unit 130 may set the size and shape of each of the plurality of virtual crowns based on the region in which the plurality of teeth has been lost and the number of the plurality of lost teeth. In this case, the first setting unit 130 may set the size and shape of each of the plurality of virtual crowns by using a reference teeth model generated based on the region in which the plurality of teeth has been lost and the number of the plurality of lost teeth. In other words, the computing system 100 may determine whether an implantation target region is a molar region, an overall region (in the case of edentulous or full mouth implantation), or a region for the replacement of a specific lost tooth first, and may then invoke a reference teeth model.

The first setting unit 130 may receive the reference teeth model generated based on the region in which the plurality of teeth has been lost and the number of the plurality of lost teeth, and may initially place the reference teeth model in the region in which the plurality of teeth has been lost. The user interface control unit 140 provides batch correction mode for the initially placed reference teeth model. The first setting unit 130 may form the reference teeth model having undergone the batch correction mode into the plurality of virtual crowns.

In this case, the user interface control unit 140 may provide mode configured to enable the sizes of the initially placed reference teeth model to be corrected in a batch manner in accordance with the length of the arc of the arch of a subject, as the batch correction mode.

In this case, the batch correction mode may be a user interface menu configured to enable the size of the initially placed reference teeth model to be corrected within the bounds of the first rule set by the first setting unit 130, i.e., a range defined by the contour lines of the plurality of teeth to be restored. The contour lines to be restored may be designated by taking into account all of the length direction of the arc of the arch, a depth direction perpendicular to the arc of the arch, and the height direction of the teeth.

The contour lines of the plurality of lost teeth to be restored may be a group of contour lines collectively formed by the plurality of teeth. For example, when the left three molars of the upper jaw and the left four molars of the lower jaw are restoration targets, the contour lines of the plurality of lost teeth to be restored may be set by taking into account all of the teeth which are the restoration targets of the upper and lower jaws. The contour lines of the left three molars of the upper jaw to be restored may be set by taking into account the locations, heights, and sizes of adjacent teeth (the remaining teeth of the upper jaw). In other words, when the contour lines to be restored are set, the occlusal surfaces formed by the remaining teeth may be taken into account. Furthermore, the contour lines to be restored may be set by taking into account the shapes of the gums of the region of the lost teeth, differences between the heights of occlusal surfaces and the gums, the functions of the lost teeth, etc.

For example, a molar, a canine, and an incisor are different in their function and shape from one another. Accordingly, the contour lines to be restored are set by taking into account this point. When a series of molars have been lost and teeth to be restored form a group, the contour lines of the group of teeth may be set by taking into account the distribution of impact exerted onto the molars during mastication. It is necessary to prevent excessive impact from being exerted onto a specific tooth. The gums and innervation of a region in which teeth have been lost may be additionally taken into account.

After the first rule has been set for the group of teeth to be restored, the process of verifying the first rule may be performed. After the first rule has been set, an optimization process for each of the teeth is performed within the bounds of the first rule. The optimization process to be repeatedly performed for each of the teeth can be significantly simplified by setting a common rule for the group of teeth first.

After a location, a size, and a shape have been set for each tooth, the specific design of an implant structure may be performed in accordance with the process stipulated in the above-described related art document partially, i.e., Korean Patent No. 10-1623356, or the like. The present invention is distinguished from the above-described related art and other conventional technologies in that the spirit of the present invention is directed to, prior to optimization for each tooth, the setting of a common rule for a plurality of teeth and the provision of batch correction mode for a group of teeth.

Figure 2:
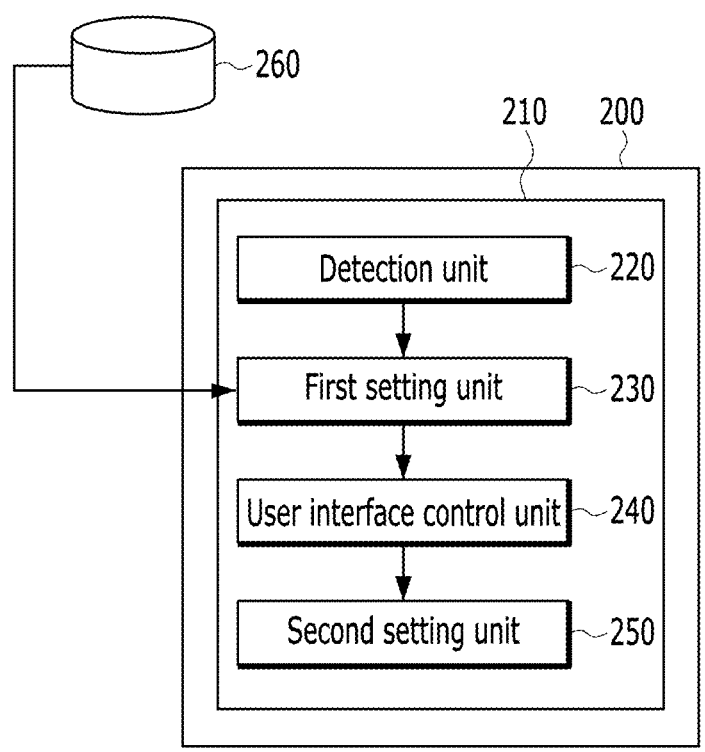
FIG. 2 is a view showing a computing system for dental implant planning according to an embodiment of the present invention.

FIG. 2 is a view showing a computing system 200 for dental implant planning according to an embodiment of the present invention. The principal functions of a detection unit 220, a first setting unit 230, a user interface control unit 240, and a second setting unit 250 included in a processor 210 are similar to those of the computing system 100 shown in FIG. 1. Redundant descriptions are omitted.

The first setting unit 230 of FIG. 2 may invoke a reference teeth model from a reference teeth model DB 260. The reference teeth model may be provided via a standardized library defined based on the locations of teeth to be restored.

Reference teeth models may be classified based on the genders, ages and/or the like of subjects. A reference teeth model suitable for conditions, i.e., the gender, age and/or the like of a current subject, may be invoked. Reference teeth models may be defined based on the locations and functions of teeth. For example, a molar, a canine, and an incisor are different in their function and shape from one another. If a plurality of teeth has been lost in sequence, the number of the plurality of lost teeth and the locations of the plurality of lost teeth may be translated into their locations and functions. Therefore, reference teeth models may be generated based on the region in which the plurality of teeth has been lost and the number of the plurality of lost teeth, taking into account their locations and functions.

Figure 3:
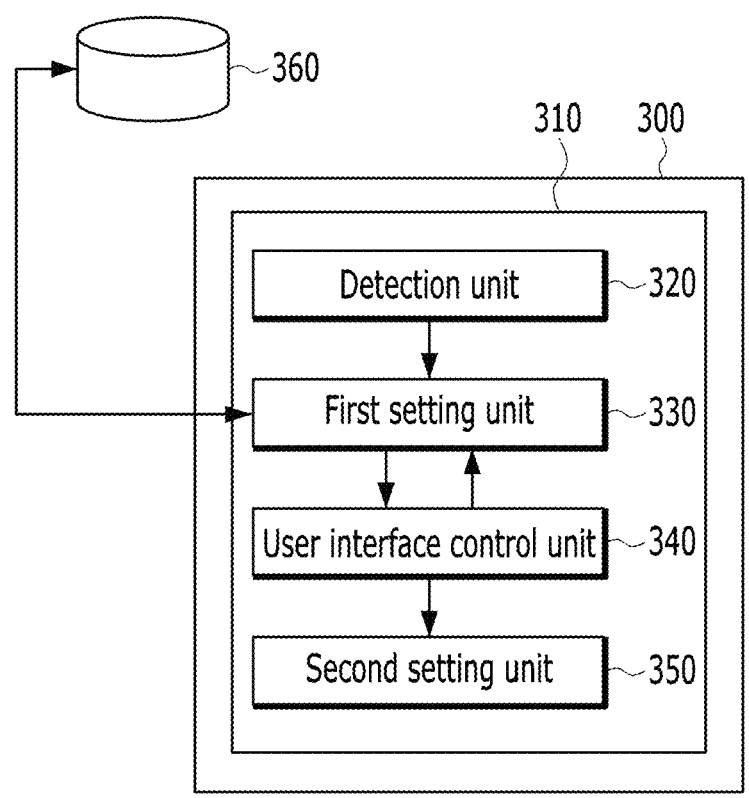
FIG. 3 is a view showing a computing system for dental implant planning according to an embodiment of the present invention.

FIG. 3 is a view showing a computing system 300 for dental implant planning according to an embodiment of the present invention. The principal functions of a detection unit 320, a first setting unit 330, a user interface control unit 340, a second setting unit 350, and a reference teeth model DB 360 included in a processor 310 are similar to those of the computing system 200 shown in FIG. 2. Redundant descriptions are omitted.

When virtual crowns generated based on the reference teeth model and placed by the first setting unit 330 are corrected in compliance with a user input command via the user interface control unit 340, information about the correction of the virtual crowns may be fed back to the first setting unit 330. The correction of the virtual crowns may be performed by correcting each of the virtual crowns or by collectively correcting the group of virtual crowns.

The first setting unit 330 may transmit information about the details of the correction of the virtual crowns to the reference teeth model DB 360. The reference teeth model DB 360 may make an update with the information about the details of the correction. The information about the details of the correction may be designated as being directed to the correction of each of the virtual crowns or the collective correction of the group of virtual crowns, and may then be transferred and used for an update. The reference teeth model DB 360 may collect the details of correction, and may generate a new reference teeth model when data about a new specific teeth model which is not covered by existing reference teeth models is accumulated.

Figure 4:
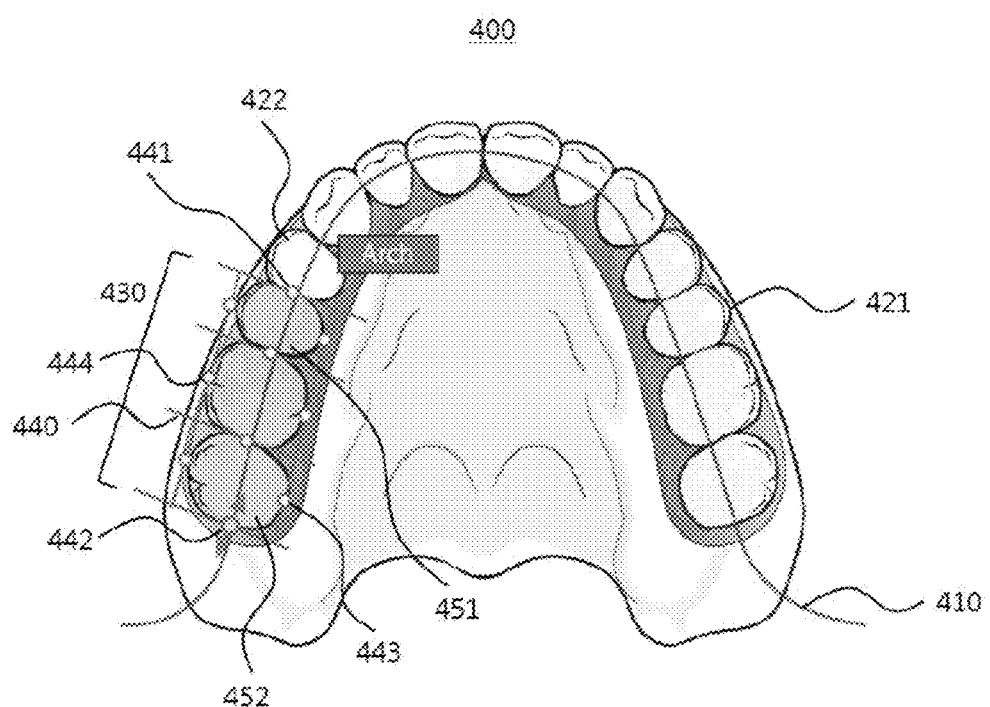
FIG. 4 is a view showing the placement of virtual crowns and batch correction mode according to an embodiment of the present invention.

FIG. 4 is a view showing the placement of virtual crowns and batch correction mode according to an embodiment of the present invention.

Referring to this drawing, a top view image of teeth of a subject is shown. There is shown an image in which teeth are arranged in the length direction of an arch 410.

Any of the remaining teeth is named a first tooth 421. A lost teeth region 430 is identified via the detection unit 120, 220 or 320 based on the teeth image. A remaining tooth adjacent to the lost teeth region 430 is referred to as a second tooth 422 for ease of description.

A teeth restoration region 440 may be set in accordance with the lost teeth region 430. The teeth restoration region 440 may set part of contour lines to be restored. In other words, information about the sizes of the contour lines in the lengthwise and depth directions of the arch is represented in the teeth restoration region 440. Although not shown in FIG. 4, the contour lines to be restored may include information about the size in the height direction of the arch 410, as described above.

The end of one side of the lost teeth region 430 in the length direction of the arch 410 may be referred to as a first boundary point 441. A second boundary point 442 may be located at the end of the other side of the lost teeth region 430. The teeth restoration region 440 may be set based on the lost teeth region 430. The size in the length direction of the arch 410 may be defined by the first boundary point 441 and the second boundary point 442.

In FIG. 4, there is also shown an example of batch correction mode. The location of the first boundary point 441 is defined as an intersection between a boundary surface of the adjacent second tooth 422 and the arch 410. The second boundary point 442 may be presented by initial virtual crowns 451 and 452 defined based on a reference teeth model by the first setting unit 130, 230 or 330.

In batch correction mode configured to enable a user to make a correction, there is presented mode configured to enable the sizes of the teeth restoration region 440 to be corrected in the length direction of the arch 410 in a batch manner by moving the second boundary point 442. In FIG. 4, a UI for batch correction mode is also displayed at the second boundary point 442.

A plurality of virtual crowns may be placed within the teeth restoration region 440. In FIG. 4, three virtual crowns are placed within the teeth restoration region 440. There are shown the first virtual crown 451 closest to the remaining second tooth 422 and the second virtual crown 452 farthest from the remaining second tooth 422. When the location of the second boundary point 442 is moved via batch correction mode displayed at the second boundary point 442, a change in size may be applied to the three virtual crowns in a collective manner.

In the batch correction mode shown in FIG. 4, there is shown a means by which a correction is applied to a plurality of virtual crowns in a collective manner and then each of the virtual crowns can be optimized.

In the conventional technology compared with the technology of FIG. 4, the first virtual crown 451 must be defined first, and each additional virtual crown must be added and defined. In this case, when a problem with the setting of the second virtual crown 452 occurs, correction must start again with the first virtual crown 451, with the result that a problem arises in that the correction of each virtual crown/virtual tooth must be repeated from the beginning.

The present invention is intended to rapidly and conveniently set up a restoration and implant plan for a plurality of teeth through the provision of a top-down workflow.

First, the detection unit 120, 220 or 320 of the processor 110, 210 or 310 becomes aware that three teeth have been lost and are restoration targets in FIG. 4 based on a teeth image.

The first setting unit 130, 230 or 330 may invoke a reference teeth model for three molars. The first setting unit 130, 230 or 330 may additionally display the invoked reference teeth model on the teeth image as initialized virtual crowns. In this case, in order to be distinguished from the remaining teeth, the virtual crowns may be displayed with their visualization element, such as their color, contrast, or the like, differentiated.

When the location of the second boundary point 442 is changed in response to a user command in batch correction mode displayed at the second boundary point 442, the size of the teeth restoration region 440 in the length direction of the arch 410 is determined based on the changed location of the second boundary point 442. A change in the size of the teeth restoration region 440 in the length direction of the arch 410 may be applied to the three virtual crowns in a collective manner. In this case, although changes in the sizes of the virtual crowns may be applied at ratios proportional to the ratios between the sizes of initial virtual crowns, such a change in size may be limited by a minimum or maximum size criterion for a tooth in which each of the virtual crowns is located. For example, when a user command to increase the size of the teeth restoration region 440 in the length direction of the arch 410 is received but the outermost second virtual crown 452 has already reached its maximum size, the second virtual crown 452 may not be further increased and the changes in size may be applied only to the remaining virtual crowns.

Although a user menu configured to change sizes in the length direction of the arch 410 is shown in FIG. 4, a user menu configured to change sizes in the depth or height direction of the arch 410 may be presented in another embodiment. For example, when the location of a third boundary point 443 or fourth boundary point 444 is changed in response to a user input, sizes in the depth direction of the arch 410 may be changed in a batch manner. In this case, the ratios between the sizes of the virtual crowns in the depth direction of the arch 410 may be applied, and such a change in size may be limited by a maximum or minimum size criterion.

Figure 5:
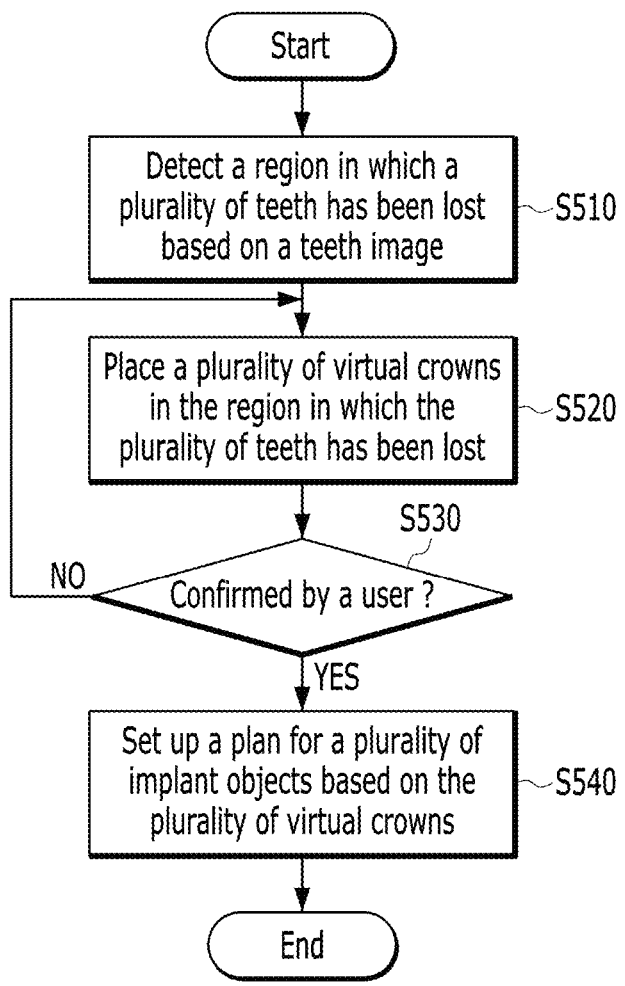
FIG. 5 is an operation flowchart showing a method for dental implant planning according to an embodiment of the present invention.

FIG. 5 is an operation flowchart showing a method for dental implant planning according to an embodiment of the present invention.

At step S510, the detection unit 120, 220 or 320 may detect a region in which a plurality of teeth has been lost based on a teeth image.

At step S520, the first setting unit 130, 230 or 330 may place a reference teeth model in the region in which the plurality of teeth has been lost as a plurality of virtual crowns.

At step S530, the user interface control unit 140, 240 or 340 may feed information about whether or not a user has performed confirmation back to the first setting unit 130, 230 or 330.

When a command to confirm the existing virtual crowns has not been input by the user or resetting is required, the first setting unit 130, 230 or 330 may correct the virtual crowns in accordance with predetermined criteria and place the corrected virtual crowns in a lost teeth region at step S520. In this case, the automatic correction of the virtual crowns is limited by the first rule to be applied in a collective manner, such as contour lines to be restored or the like, and may be performed when a teeth restoration region is changed due to the analysis of a valid gum region or the like.

When a command to confirm the existing virtual crowns is input by the user, the second setting unit 150, 250 or 350 may set up a plan for a plurality of implant objects based on the plurality of virtual crowns at step S540.

Figure 6:
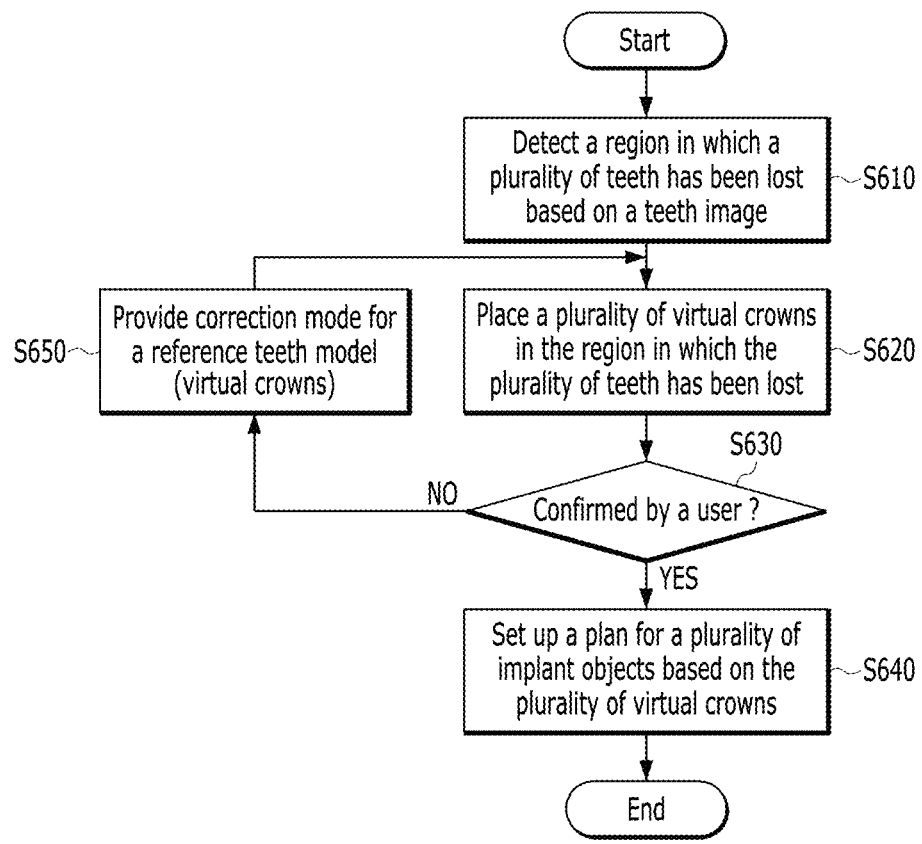
FIG. 6 is an operation flowchart showing a method for dental implant planning according to an embodiment of the present invention.

FIG. 6 is an operation flowchart showing a method for dental implant planning according to an embodiment of the present invention.

Since steps S610 to S640 are similar to the functions of automatically correcting and generating virtual crowns shown in FIG. 5, redundant descriptions are omitted.

Referring to FIG. 6, when the user has not confirmed the existing virtual crowns or resetting is required, correction mode configured to enable the user to correct the virtual crowns in a batch manner may be provided at step S650.

When a command to correct the existing virtual crowns is input by a user via batch correction mode, the first setting unit 130, 230, 330 may place virtual crowns, having corrected sizes, in the lost teeth region at step S620. Since the batch correction mode has been described in conjunction with FIG. 4, a redundant description thereof is omitted.

Figure 7:
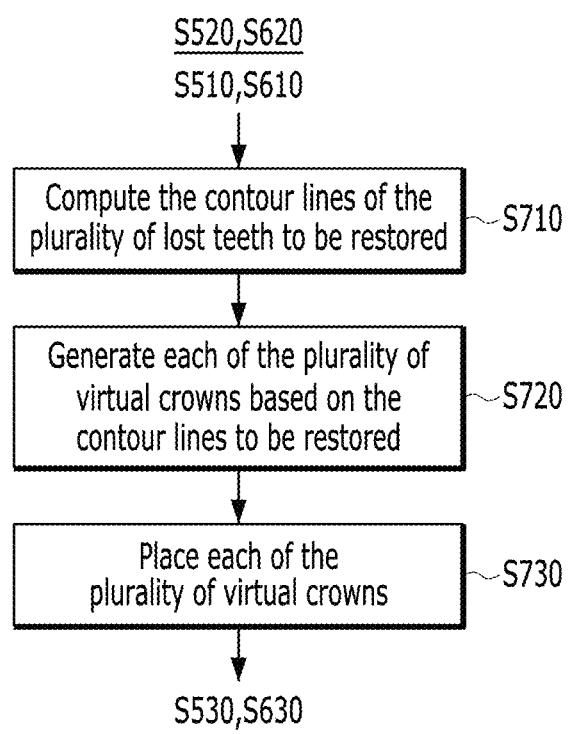
FIG. 7 is a partial operation flowchart showing an embodiment of one specific step of FIGS. 5 and 6 in greater detail.

FIG. 7 is a partial operation flowchart showing an embodiment of one specific step of FIGS. 5 and 6 in greater detail.

After the performance of step S520 or S620, the first setting unit 130, 230 or 330 may compute contour lines to be restored for the plurality of lost teeth at step S710.

At step S720, the first setting unit 130, 230 or 330 may generate each of a plurality of virtual crowns based on the contour lines to be restored.

At step S730, the first setting unit 130, 230 or 330 may place each of the plurality of generated virtual crowns within the lost teeth region.

The contour lines to be restored are the contour lines of a group of teeth formed by the plurality of lost teeth, and may be set by taking into account all the length, depth and height directions of the arch 410.

A method for dental implant planning according to an embodiment of the present invention may be implemented in the form of program instructions executable by a variety of computer means, and may be stored in a computer-readable storage medium. The computer-readable storage medium may include program instructions, a data file, and a data structure solely or in combination. The program instructions which are stored in the medium may be designed and constructed particularly for the present invention, or may be well known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

However, the present invention is not limited and restricted by the embodiments. Throughout the drawings, the same reference symbols denote the same members. The lengths, heights, sizes, widths, etc. introduced in the embodiments and drawings of the present invention may be exaggerated to help an understanding of the present invention.

According to the present invention, an implant plan can be set up by taking into account an aesthetic factor and the final satisfaction of a patient first.

According to the present invention, the procedure and time required to set up an overall implant plan can be curtailed by simplifying a process to be applied to a plurality of teeth in the same manner in a situation in which simultaneous implantation for a plurality of teeth is required in the case of full mouth (edentulous) implantation or the like.

According to the present invention, an effective implant plan optimization user interface (UI) for a plurality of teeth can be implemented.

According to the present invention, there can be provided a two-step implant plan optimization technique in which a criterion, which is to be collectively followed by a plurality of teeth, is generated by taking into an aesthetic factor and the function of the teeth in a composite manner and then each of the plurality of teeth is optimized within the bounds of the criterion.

The present invention was derived from the research conducted as a part of the Core Technology Development Project for Biological Medical Apparatus Industry sponsored by the Korean Ministry of Trade, Industry and Energy and the Korea Evaluation Institute of Industrial Technology [Project Management Number: 10052753; and Project Name: Development of 3D Printer-based Restorative Prosthesis Fabrication and Reconstruction System for the Elderly and Disadvantaged, which Fulfills Low Cost, Rapid speed and Aesthetic Satisfaction, Is Intended for Edentulous and Carnio-Maxillo-Facial Defect Patients, and Has a Fatigue Limit of 200 N and a Retention Force of 30 N].

While the present invention has been described in conjunction with specific details, such as specific components, and limited embodiments and diagrams above, these are provided merely to help an overall understanding of the present invention. The present invention is not limited to these embodiments, and various modifications and alterations may be made based on the foregoing description by those having ordinary knowledge in the art to which the present invention pertains.

Therefore, the technical spirit of the present invention should not be determined based only on the described embodiments, and not only the following claims but also all equivalents to the claims and equivalent modifications should be construed as falling within the scope of the spirit of the present invention.

What is claimed is:

1. A method for dental implant, the method comprising:
   detecting a region in which a plurality of teeth has been lost based on a teeth image;
   placing a plurality of virtual crowns based on a preset first rule in the region in which the plurality of teeth has been lost, wherein the first rule is set prior to the placing the plurality of virtual crowns, the first rule being set to be collectively followed by a plurality of teeth to be implanted in the region in which the plurality of teeth has been lost, and wherein a number of the plurality of virtual crowns are set to correspond to a number of the plurality of teeth that has been lost;

receiving a user's confirmation for the plurality of virtual crowns; and setting up a plan for a plurality of implant objects, to be placed in the region in which the plurality of teeth has been lost, based on the plurality of virtual crowns, wherein the placing comprises:

computing contour lines of the plurality of lost teeth to be restored based on the region in which the plurality of teeth has been lost and a number of the plurality of lost teeth;

designating contour lines as at least a part of the first rule; and generating each of the plurality of virtual crowns based on the contour lines of the plurality of lost teeth to be restored, wherein the contour lines collectively regulate at least a height of each of the plurality of virtual crowns at an initial stage of the generation of each of the plurality of virtual crowns.

2. The method of claim 1, wherein the placing comprises setting a size and shape of each of the plurality of virtual crowns based on the region in which the plurality of teeth has been lost and a number of the plurality of lost teeth.

3. The method of claim 2, wherein the placing comprises setting the size and shape of each of the plurality of virtual crowns by using a reference teeth model generated based on the region in which the plurality of teeth has been lost and the number of the plurality of lost teeth.

4. The method of claim 1, wherein the placing comprises:

receiving a reference teeth model generated based on the region in which the plurality of teeth has been lost and a number of the plurality of lost teeth, and initially placing the reference teeth model in the region in which the plurality of teeth has been lost;

providing batch correction mode for the initially placed reference teeth model; and forming the reference teeth model having undergone the batch correction mode into the plurality of virtual crowns.

5. The method of claim 4, wherein the providing comprises providing mode adapted to enable sizes of the initially placed reference teeth model to be corrected in a batch manner in accordance with a length of an arc of an arch of a subject, as the batch correction mode.

6. A computing system for dental implant planning, the computing system comprising a processor and being connected to a display device, the processor is configured to:

detect a region in which a plurality of teeth has been lost based on a teeth image;

compute contour lines of the plurality of lost teeth to be restored based on the region in which the plurality of teeth has been lost and a number of the plurality of lost teeth;

place a plurality of virtual crowns based on a preset first rule in the region in which the plurality of teeth has been lost, wherein the first rule includes the contour lines as at least a part thereof, and the first rule is set prior to the placing the plurality of virtual crowns, the first rule being set to be collectively followed by a plurality of teeth to be implanted in the region in which the plurality of teeth has been lost, and wherein a number of the plurality of virtual crowns are set to correspond to a number of the plurality of teeth that has been lost;

generate each of the plurality of virtual crowns based on the contour lines of the plurality of lost teeth to be restored, wherein the contour lines collectively regulate at least a height of each of the plurality of virtual crowns at an initial stage of the generation of each of the plurality of virtual crowns;

receive an input based on a user's operation of confirming the plurality of virtual crowns; and set up a plan for a plurality of implant objects, to be placed in the region in which the plurality of teeth has been lost, based on the plurality of virtual crowns.

7. The computing system of claim 6, wherein the processor is further configured to set a size and shape of each of the plurality of virtual crowns based on the region in which the plurality of teeth has been lost and a number of the plurality of lost teeth.

8. The computing system of claim 7, wherein the processor is further configured to set the size and shape of each of the plurality of virtual crowns by using a reference teeth model generated based on the region in which the plurality of teeth has been lost and the number of the plurality of lost teeth.

9. The computing system of claim 6, wherein the processor is further configured to:

receive a reference teeth model generated based on the region in which the plurality of teeth has been lost and a number of the plurality of lost teeth;

initially place the reference teeth model in the region in which the plurality of teeth has been lost;

provide batch correction mode for the initially placed reference teeth model; and form the reference teeth model having undergone the batch correction mode into the plurality of virtual crowns.

10. The computing system of claim 9, wherein the processor is further configured to provide mode adapted to enable sizes of the initially placed reference teeth model to be corrected in a batch manner in accordance with a length of an arc of an arch of a subject, as the batch correction mode.

11. A non-transitory computer-readable medium containing program instructions executed by a processor installed in a computing system for dental implant planning, wherein the program instructions when executed are configured to:

detect a region in which a plurality of teeth has been lost based on a teeth image;

compute contour lines of the plurality of lost teeth to be restored based on the region in which the plurality of teeth has been lost and a number of the plurality of lost teeth;

place a plurality of virtual crowns based on a preset first rule in the region in which the plurality of teeth has been lost, wherein the first rule is set prior to the placing the plurality of virtual crowns, the first rule being set to be collectively followed by a plurality of teeth to be implanted in the region in which the plurality of teeth has been lost, and wherein a number of the plurality of virtual crowns are set to correspond to a number of the plurality of teeth that has been lost;

generate each of the plurality of virtual crowns based on the contour lines of the plurality of lost teeth to be restored, wherein the contour lines collectively regulate at least a height of each of the plurality of virtual crowns at an initial stage of the generation of each of the plurality of virtual crowns;

receive an input based on a user's operation of confirming the plurality of virtual crowns; and set up a plan for a plurality of implant objects, to be placed in the region in which the plurality of teeth has been lost, based on the plurality of virtual crowns.

\* \* \* \* \*